(12) United States Patent
Miyazaki et al.

(10) Patent No.: US 8,330,718 B2
(45) Date of Patent: Dec. 11, 2012

(54) CURSOR POSITIONING CONTROL DEVICE

(75) Inventors: Naoyuki Miyazaki, Nagano (JP); Takashi Kashino, Nagano (JP); Naoki Yamaguchi, Nagano (JP)

(73) Assignee: Minebea Co., Ltd., Nagano (JP)

( * ) Notice: Subject to any disclaimer, the term of this patent is extended or adjusted under 35 U.S.C. 154(b) by 41 days.

(21) Appl. No.: 12/985,783

(22) Filed: Jan. 6, 2011

(65) Prior Publication Data

US 2011/0169733 A1 Jul. 14, 2011

(30) Foreign Application Priority Data

Jan. 11, 2010 (JP) ................................. 2010-003508

(51) Int. Cl.
*G09G 5/08* (2006.01)
(52) U.S. Cl. ........................................ 345/157; 345/156
(58) Field of Classification Search ........... 345/156–167
See application file for complete search history.

(56) References Cited

U.S. PATENT DOCUMENTS

| 5,191,641 | A | * | 3/1993 | Yamamoto et al. | ........... 345/418 |
| 5,570,111 | A | | 10/1996 | Barrett et al. | |
| 7,274,355 | B2 | * | 9/2007 | Betts-LaCroix et al. | ..... 345/157 |

FOREIGN PATENT DOCUMENTS

| JP | 7-005989 A | 1/1995 |
| JP | 8-212008 A | 8/1996 |

* cited by examiner

*Primary Examiner* — Amare Mengistu
*Assistant Examiner* — Premal Patel
(74) *Attorney, Agent, or Firm* — Carrier Blackman & Associates, P.C.; Joseph P. Carrier; William D. Blackman

(57) ABSTRACT

A cursor positioning control device is provided. The device includes a cursor movement measuring unit configured to measure a measurement value corresponding to a movement amount of a cursor on a display every certain time, a cursor deceleration determination unit configured to subtract an N-th measurement value from an (N−1)-th measurement value of the cursor movement measuring unit, and configured to determine that the cursor is being decelerated if the subtracted value is greater than a predetermined threshold value, wherein N is a natural number. When the number of successive times that the subtracted value is greater than the predetermined threshold value exceeds a predetermined number of times, the cursor deceleration determination unit generates an instruction signal for at least further decelerating a movement of the cursor than a cursor movement deceleration speed that a user instructs.

5 Claims, 3 Drawing Sheets

CURSOR POSITIONING CONTROL DEVICE

BACKGROUND OF THE INVENTION

1. Field of the Invention

The present invention relates to a cursor positioning control device for a cursor displayed on a display of a personal computer.

2. Description of the Related Art

There is known a cursor positioning control device for a cursor displayed on a display of a personal computer (see JP-A-H8-212008 and JP-A-H7-5989). For example, JP-A-H8-212008 describes a cursor positioning control device (pointing device) for improving usability of a user when a cursor movement operation is performed in a graphical user interface, particularly, when a cursor operation is started or stopped.

Specifically, the pointing device described in JP-A-H8-212008 includes a converter for converting a user's operation such as an operation on the converter into an input parameter. The pointing device further includes a transfer function unit connected to receive the input parameter. The transfer function unit is configured to generate a symbol movement signal indicating amplification of changes of value of the input parameter, responsive to successive input values. That is, when a user starts to operate the converter, for example, the user starts to press an isometric joystick, the input parameter changes from zero to a finite value. In the cursor movement control method employed in the pointing device, this finite value, by itself, results in a given cursor movement using the conventional transfer function.

In the meantime, JP-A-H7-5989 describes a cursor positioning control device for smoothening cursor movement between items such as menus of icons or buttons.

The cursor positioning control device described in JP-A-H8-212008 causes a "negative inertia" to be applied at acceleration and deceleration of the cursor as described above. That is, when the cursor is largely decelerated, an excessive brake is applied to decelerate the cursor. Also, when the cursor is accelerated, the "negative inertia" causes a sudden acceleration operation of the cursor. Therefore, in this cursor positioning control device, there is a problem in that when a fine operation is performed on the cursor to move the cursor, for example between adjacent icons, the negative inertia is excessively applied in concurrence with the movement of the cursor to cause the cursor to be suddenly accelerated and pass a target on which the cursor intended to be stopped. That is, there is a problem in that it is difficult to perform the fine movement operation of the cursor.

Additionally, in the cursor positioning control device described in JP-A-H8-212008, there is a case where the negative inertia is excessively applied when the cursor is stopped on the target such as an icon upon fine movement operation of the cursor as described above. As a result, there is a problem in that the cursor can not be stopped exactly on the target, and the cursor has to be returned in a direction opposite to the original movement direction and might become rather distant from the target.

On the other hand, when performing an operation of moving the cursor to the target largely distant on a display, a user intends to move the cursor as quickly as possible because the starting point of the cursor is distant from the target (end point). Accordingly, the speed of the cursor largely increases near the target.

Generally, a user visually estimates a timing when the movement of the cursor is stopped, and intends to stop the cursor by reflecting the motion of a mouse by the hand or the motion of a pointing stick by the finger. However, since a thinking process needs to be performed at the brain between the visual recognition and the stop operation, a time lag occurs between the visual recognition and the stop operation. As a result, even though the motion of the mouse or the pointing stick is stopped by the hand or finger at the moment when the user intends to stop the cursor based on the visual sense, the cursor might pass the target. Accordingly, it becomes necessary to adjust the position of the cursor on the target by returning the cursor in a direction opposite to the original movement direction of the cursor.

Particularly, when a user who is used to moving a cursor with the hand on a mouse connected to a desktop computer or a notebook computer replaces the computer with a notebook computer including a pointing stick to move a cursor, there occur many cases similarly to the above because the user is unfamiliar with the pointing stick that the user manipulates with the finger. Also, when even a user familiar with the operation of the pointing stick uses the notebook computer during riding in airplane or train that is always vibrated, the operation efficiency of the pointing stick may be largely reduced.

In the meantime, the cursor positioning control device described in JP-A-H7-5989 reduces the amount of operation of the pointing device such as a mouse, in the cursor movement between items such as menus of icons or buttons. Accordingly, this device can facilitate a fine operation such as pointing of icons, buttons, and menus and can smoothen the cursor movement in response to the operation of the pointing device regardless of the position of the cursor on the display. However, in the object of the invention described in JP-A-H7-5989, it is not described to perform appropriate positioning control by preventing the passing or returning of the cursor with respect to the target. That is, an object of the present invention is different from that of JP-A-H7-5989.

SUMMARY OF THE INVENTION

An object of the present invention is to provide a cursor positioning control device which allows cursor positioning by exactly and quickly stopping a cursor with respect to a target, which are displayed on a display of a computer (personal computer).

According to an illustrative embodiment of the present invention, there is provided a cursor positioning control device comprising:

a cursor movement measuring unit configured to measure a measurement value corresponding to a movement amount of a cursor on a display every certain time or time period;

a cursor deceleration determination unit configured to subtract an N-th measurement value from an (N−1)-th measurement value of the cursor movement measuring unit, and configured to determine that the cursor is being decelerated if the subtracted value is greater than a predetermined threshold value, wherein N is a natural number, wherein when a number of successive times that the subtracted value is greater than the predetermined threshold value exceeds a predetermined number of times, the cursor deceleration determination unit generates an instruction signal for at least further decelerating a movement of the cursor to a deceleration speed less than a cursor movement deceleration speed that a user instructs. As used herein, "subtracted value" is used synonymously with "difference".

According to the above cursor positioning control device, a "negative inertia" is not applied upon acceleration and deceleration of the cursor unlike the cursor positioning control device described in JP-A-H8-212008. Accordingly, when a fine operation is performed on the cursor to move the cursor between adjacent icons, the negative inertia is not excessively applied in concurrence with the movement of the cursor, which causes the cursor to suddenly accelerate and pass a target.

Further, there is no additional disadvantage such as there is in the cursor positioning control device of JP-A-H8-212008. That is, according to the above cursor positioning control device, there can be prevented the case where the cursor is not stopped exactly on the target due to the negative inertia excessively applied when the cursor is stopped on the target and needs to be returned.

Further, in performing an operation of moving the cursor to the target distant on the display, the conventional problem caused when a user intends to move the cursor as quickly as possible can be solved. In the conventional case, the speed of the cursor may significantly increase near the target. As a result, a problem resulting from a time lag due to the thinking process of the brain between the visual recognition and the stop operation even though the motion of the mouse by the hand or the motion of the pointing stick by the finger are stopped at the moment when a user intends to stop the cursor by the visual sense may occur. However, with the present invention such problem can be prevented. Specifically, the cursor can be prevented from passing the target. Accordingly, there is no need to adjust the position on the target by returning the cursor in a direction opposite to the movement direction of the cursor.

In the above cursor positioning control device, the instruction signal generated when the number of successive times that the subtracted value is greater than the predetermined threshold value exceeds the predetermined number of times may be for stopping the movement of the cursor.

According to this configuration, it is possible to further enhance the effects which are obtained by merely decelerating the movement of the cursor.

That is, since the cursor positioning control device stops the cursor just before the moment when a user intends to stop the cursor, the user can actually stop the cursor at the same time when the user thinks to stop the cursor. As a result, the cursor positioning control device, having excellent usability for a user unfamiliar with the cursor operation can be achieved.

In the above cursor positioning control device, an operating unit configured to position the cursor includes a pointing stick.

According to this configuration, a conventional inconvenience that it is difficult for a user unfamiliar with stick operation to determine the position of the cursor with respect to the target when the user who connects a mouse to a desktop computer or a notebook computer and is moving the cursor by his hand replaces the computer with a notebook computer including a pointing stick to operate the pointing stick by his finger can be solved.

Also, when even a user familiar with the operation of the pointing stick uses a notebook computer during riding in airplane or train that is always vibrated, the operation efficiency of the pointing stick may not be reduced.

According to the above configuration, there is provided a cursor positioning control device, which allows cursor location determination by quickly stopping a cursor with respect to a target displayed on a display of, for example, a computer.

BRIEF DESCRIPTION OF THE DRAWINGS

In the accompanying drawings.

DETAILED DESCRIPTION

Hereinafter, a cursor positioning control device according to an illustrative embodiment of the present invention will be described in detain with reference to the accompanying drawings.

Figure 1:
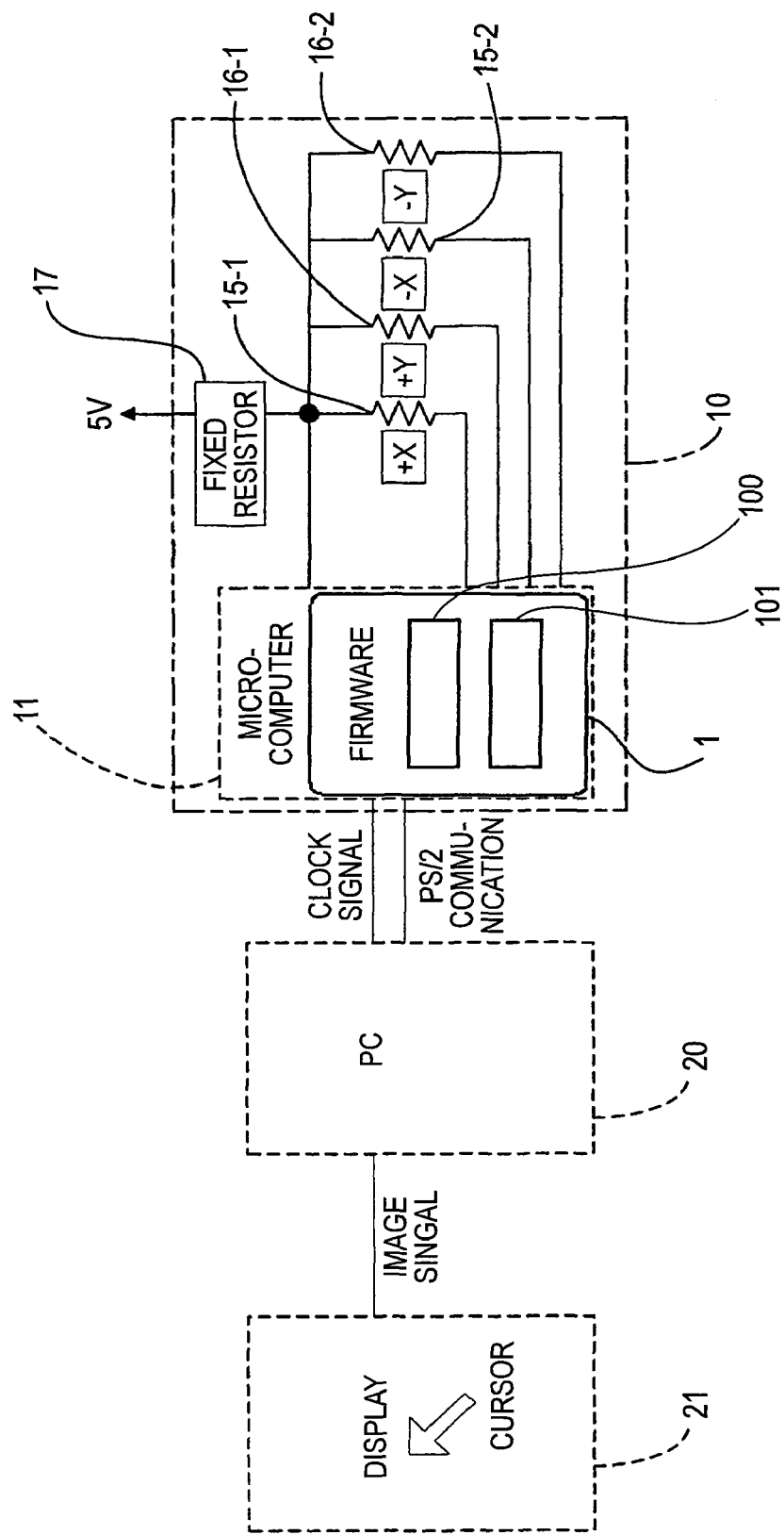
FIG. 1 is a block diagram illustrating a cursor positioning control device according to an illustrative embodiment of the present invention.

A cursor position control device 1 according to an illustrative embodiment of the present invention is provided as a firmware in a microcomputer 11 of a pointing device 10 connected to a personal computer (PC) 20 as shown in FIG. 1. The cursor positioning control device 1 is configured to perform a positioning control of a cursor displayed on a display 21 of the PC 20 using a pointing stick (not shown) of a PC user.

The pointing device 10 includes the microcomputer 11 and the pointing stick, and is connected to the PC 20 through a synchronous clock signal line and sends operation data of the pointing stick to the PC 20 by PS/2 communication.

The cursor positioning control device 1 includes a cursor movement measuring unit 100 and a cursor deceleration determination unit 101. The cursor movement measuring unit 100 is configured to measure the movement amount of the cursor on the display every certain time (for example, about 15 milliseconds). The cursor deceleration determination unit 101 is configured to subtract an N-th measurement value (N is a natural number) from an (N−1)-th measurement value by the cursor movement measuring unit 100 to determine that the cursor is being decelerated when the difference between the two values is greater than a predetermined threshold value. Additionally, the unit 101 generates an instruction for forcibly stopping the movement of the cursor in the case where the difference or subtracted value has exceeded the predetermined threshold value for a consecutive number of times which is greater than a predetermined number of times. In other words, when the number of successive times that the subtracted value is greater than the predetermined threshold value exceeds the predetermined number of times.

In the present illustrative embodiment, the pointing stick includes a schematic circuit configuration shown in FIG. 1, and includes four strain gauges 15-1, 15-2, 16-1 and 16-2 on a plastic support plate (not shown) having deformable flexibility according to the operation of the pointing stick. The four strain gauges 15-1, 15-2, 16-1 and 16-2 are provided on the plastic support plate deformable in response to the operation direction of the pointing stick in +X direction, −X direction, +Y direction, and −Y direction with respect to XY rectangular coordinate axes, respectively. The respective strain gauges are connected in parallel. One ends of the strain gauges 15-1, 15-2, 16-1 and 16-2 are connected to a power source of about 5 V through a fixed resistor 17, respectively, and the other ends thereof are directly connected to the microcomputer 11 of the pointing device 10, respectively. Accordingly, the resistance values of the respective strain gauges 15-1, 15-2, 16-1 and 16-2 are measured in the microcomputer 11 to control the movement amount of the cursor according to the stick operation.

Hereinafter, a control procedure performed by the cursor positioning control device 1 according to the illustrative embodiment of the present invention will be described with reference to the flowchart of FIG. 2. In operation S11, a routine for calculating the movement amount of the cursor starts when the cursor is moved by a mouse or a pointing stick. In this case, the movement amount of the cursor is consecutively measured every 15 milliseconds. The movement amount is measured by sampling the resistance values of the four strain gauges 15-1, 15-2, 16-1 and 16-2 provided on the rectangular coordinate on the plastic support plate supporting the pointing stick, respectively, when the cursor is moved by the pointing stick.

In operation S12, it is determined whether the movement amount is reduced (decelerated) or not. The N-th measurement value (N is a natural number) is subtracted from an N−1-th measurement value in the cursor movement measuring unit 100, and it is determined that the cursor is being decelerated when the subtracted value exceeds (is greater than) a predetermined threshold value.

In operation S13, it is determined whether the amount of the reduced movement is equal to or greater than an other threshold value or not. When the amount of the reduced movement is equal to or greater than the other threshold, it is recorded in a memory (not shown in FIG. 1) provided in the microcomputer 11 that the measurement value sampled at this time point corresponds to a great deceleration. On the other hand, when the amount of the reduced movement is less than the other threshold value, it is recorded in the memory of the microcomputer 11 that the measurement value sampled at this time point does not corresponds to a great deceleration. Thus, in operation S14, it is recorded in the memory whether the cursor is greatly decelerated or not, by performing consecutive sampling every movement calculation.

In operation S15, it is determined whether the great deceleration recorded in operation S14 is consecutively generated a plurality or predetermined number of times. Here, when the great deceleration is consecutively generated the predetermined number of times, for example, about two times to ten times, the cursor is forcibly stopped by generating an instruction for forcibly stopping the cursor in operation S16. On the other hand, when the great deceleration is not consecutively generated the predetermined number of times, the cursor continues to move without forcible stopping in operation S17.

In the meantime, the above operations in the flowchart can be expressed as Equation (1) below, wherein $V_N$: N-th movement amount $V_{Thres}$: Threshold value of movement amount (positive number)

$T_N$: Condition determination with respect to N-th movement (satisfied=1, unsatisfied=0).

As a condition 1, it is determined whether $T_{N1}$: $V_N < V_{N-1}$. That is, in the condition 1, it is detected that the N-th movement amount is less than the (N−1)-th movement amount (decelerating). This corresponds to operation S12 of the flowchart described above.

Next, as a condition 2, it is determined whether $T_{N2}$: $V_{Thres} < |V_N - V_{N-1}|$ or not. That is, in the condition 2, it is detected that a difference between the N-th and the (N−1)-th just before the N-th is equal to or greater than the threshold value of the movement amount. This corresponds to operation S13 of the flowchart described above.

Next, as a condition 3, it is determined whether $T_N$=: $T_{N1} \cap T_{N2}$ or not. That is, in the condition 3, it is detected that both of the two conditions 1 and 2 are satisfied.

Then, the movement amount that is actually output is based on Equation (1) described below.

$$\overline{(T_N \cdot T_{N-1} \cdot T_{N-2} \cdots T_{N-n})} \times V_N \qquad (1)$$

Here, it is determined whether all conditions are satisfied or not by synthesizing the condition determinations over the last n-th movement amount. This corresponds to operation S15 of the flowchart described above. When all the conditions are satisfied, the cursor is forcibly stopped. This corresponds to operation S16 described above.

Figure 2:
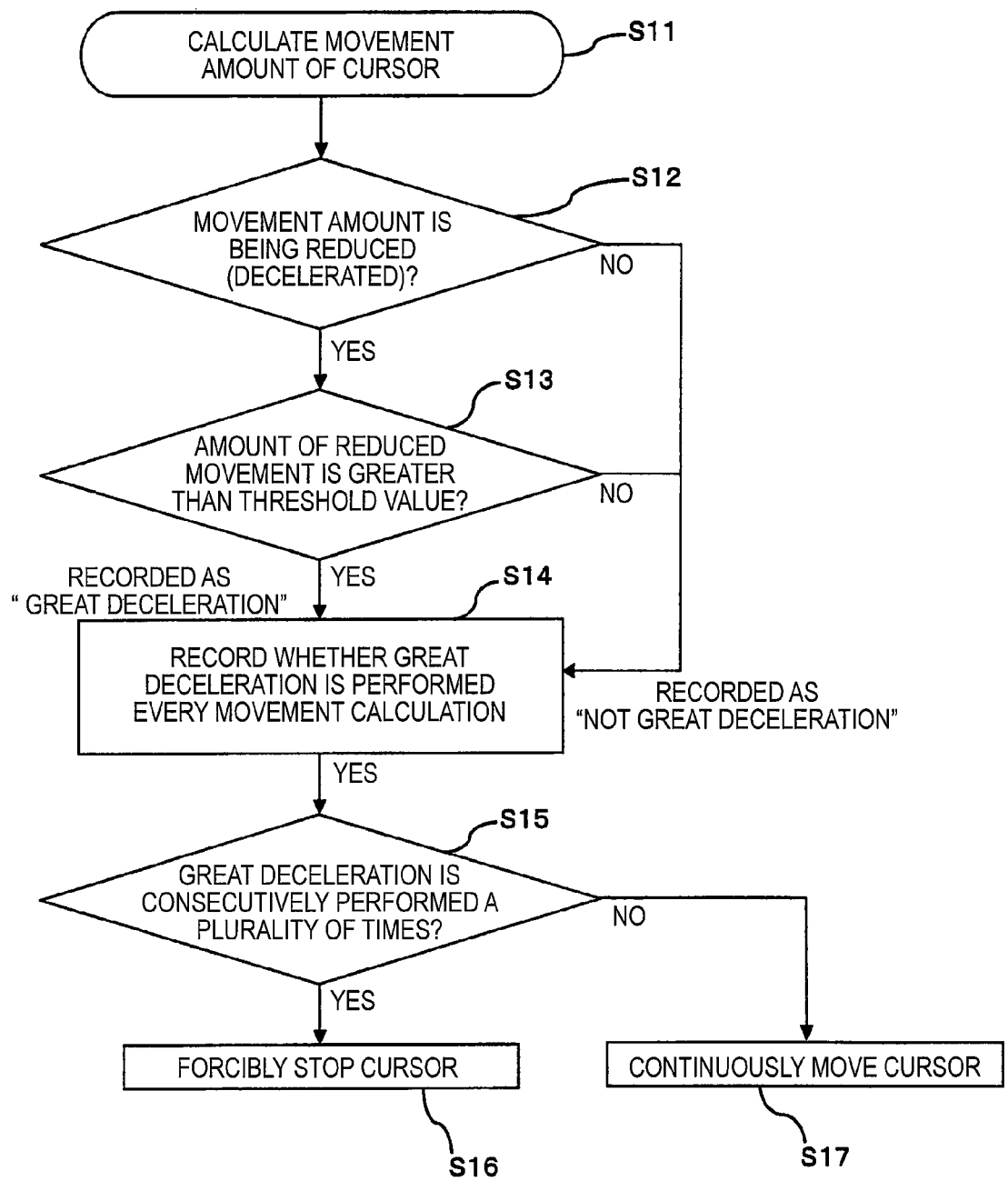
FIG. 2 is a flowchart illustrating a control procedure performed by the cursor positioning control device of FIG. 1.

Meanwhile, in the pointing device having a star connection, instead of forcibly stopping the cursor as shown in operation S16 in the flowchart of FIG. 2, an instruction signal for decelerating the movement of the cursor more than the cursor movement deceleration that a user instructs may be generated to forcibly decelerate the movement amount of the cursor on the display of the PC 20 through the PS/2 communication.

However, it may be advantageous to forcibly stop the cursor as shown in operation S16 in that the cursor is stopped by predicting a user's thought just before the moment when a user thinks to stop the cursor, that is, in that the user stops the cursor actually at the same time when the user thinks to stop the cursor.

Figure 3:
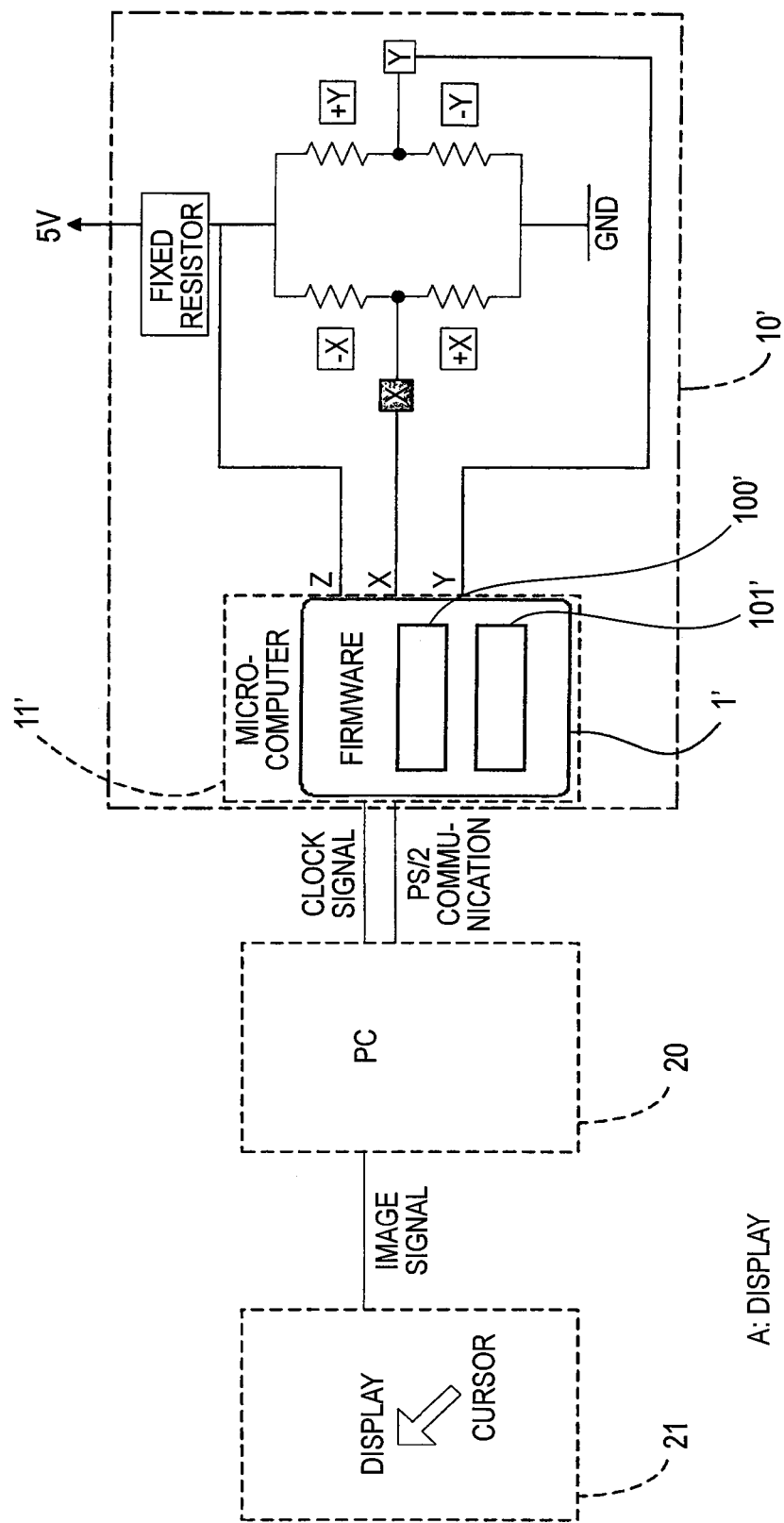
FIG. 3 is a block diagram illustrating another configuration of the cursor positioning control device of FIG. 1.

The cursor positioning control device according to the above-described illustrative embodiment can be applied to the pointing device 10' having a bridge connection shown in FIG. 3. Also in this case, the microcomputer 11' in the pointing device 10' includes a cursor positioning control device 1' as a firmware, which includes a cursor movement measuring unit 100' and a cursor deceleration determination unit.101'. Then, by performing the cursor positioning control according to the above flowchart shown in FIG. 2, a function equivalent to that of the above illustrative embodiment can be achieved.

In the pointing device 10' including the bridge connection, the movement of the cursor may also be forcibly decelerated on the display of the PC 20 through PS/2 communication, by generating an instruction signal for decelerating the movement of the cursor more than the cursor movement deceleration that a user instructs, similarly to the above-described illustrative embodiment, instead of forcibly stopping the cursor, as shown in operation S16 in the flowchart of FIG. 2.

The cursor positioning control device according to the present invention is not limited to that applied to the pointing stick according to the present illustrative embodiment, but rather can be applied to any device that is used to control the cursor movement on the display by detecting the movement of the cursor in +X direction, −X direction, +Y direction, and −Y direction using individual sensors.

For example, the cursor positioning control device can be applied to a mouse of a mechanical type including a ball to measure the displacements of the respective four directions of the rectangular coordinate using a displacement detection sensor, and a stick controller used in a computer game console.

As described above, the cursor positioning control device according to an embodiment of the present invention does not cause the cursor to be suddenly accelerated to pass the target due to an excessive negative inertia caused by the movement of the cursor when a user performs a fine operation on the cursor to move the cursor between adjacent icons.

Also, there can be prevented the case where the cursor is not exactly stopped on the target due to the negative inertia excessively applied when the cursor is stopped on the target and returned.

Particularly, when the cursor is moved to the target distant on the display in performing the cursor positioning operation using the pointing stick, the time lag resulting from the thinking process of the brain between the visual recognition and the stop operation can be predicted in advance even though the motion of the mouse by the hand and the motion of the pointing stick by the finger are stopped at the moment when a user intends to stop the cursor by the visual sense. Accordingly, since the prediction can be reflected in the cursor positioning control, the cursor can be prevented from passing the target.

Accordingly, the operability of the stick by a user unfamiliar with the operation of the pointing stick can be improved.

What is claimed is:

1. A cursor positioning control device comprising: a cursor movement measuring unit configured to measure a measurement value corresponding to a movement amount of a cursor on a display every certain time; a cursor deceleration determination unit configured to subtract an N-th measurement value from an (N−1)-th measurement value of the cursor movement measuring unit, and configured to determine that the cursor is being decelerated if the subtracted value is greater than a predetermined threshold value, wherein N is a natural number, wherein when a number of successive times that the subtracted value is greater than the predetermined threshold value exceeds a predetermined number of times, the cursor deceleration determination unit generates an instruction signal for at least further decelerating a movement of the cursor to a value less than a cursor movement deceleration speed that a user instructs; wherein the cursor if the number of successive times that the subtracted value is greater than the predetermined threshold value does not exceed the predetermined number of times, the cursor deceleration determination unit also does not generate the instruction signal for at least further decelerating the movement of the cursor to the value less than the cursor movement deceleration speed that the user instructs.

2. The cursor positioning control device according to claim 1, wherein the instruction signal generated when the number of successive times that the subtracted value is greater than the predetermined threshold value exceeds the predetermined number of times is for stopping the movement of the cursor.

3. The cursor positioning control device according to claim 1, wherein an operating unit configured to position the cursor includes a pointing stick.

4. The cursor positioning control device according to claim 1, wherein the instruction signal which the cursor deceleration determination unit generates is based on whether the number of successive times that the subtracted value is greater than the predetermined value exceeds the predetermined number of times.

5. The cursor positioning control device according to claim 1, wherein the cursor deceleration determination unit also determines that the cursor is not being decelerated if the subtraction value is not greater than the predetermined threshold value.

* * * * *